United States Patent
Yue et al.

(10) Patent No.: US 9,226,123 B2
(45) Date of Patent: Dec. 29, 2015

(54) LIMITING PROCESSING OF CALLS AS TEXT TELEPHONY CALLS

(71) Applicant: Telefonaktiebolaget L M Ericsson (publ), Stockholm (SE)

(72) Inventors: Peter Yue, St-Laurent (CA); Hung Ma, Beaconsfield (CA); Emmanuel Grecki, Montreal (CA); Pierre Gendron, Laval (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 35 days.

(21) Appl. No.: 13/772,921

(22) Filed: Feb. 21, 2013

(65) Prior Publication Data

US 2014/0235214 A1   Aug. 21, 2014

(51) Int. Cl.
*H04M 11/06* (2006.01)
*H04W 4/16* (2009.01)
*H04L 12/58* (2006.01)
(Continued)

(52) U.S. Cl.
CPC ............... *H04W 4/16* (2013.01); *H04L 51/04* (2013.01); *H04L 51/36* (2013.01); *H04M 3/42382* (2013.01); *H04M 7/0042* (2013.01); *H04W 76/00* (2013.01); *H04M 3/42391* (2013.01); *H04M 2207/185* (2013.01)

(58) Field of Classification Search
CPC ...... H04R 3/00; H04L 67/04; H04L 67/1063; H04L 67/104; H04L 63/18; H04L 63/08; H04W 8/26; H04W 48/08; H04W 12/06; H04W 76/02; H04W 84/18; H04W 48/16; H04W 84/10

See application file for complete search history.

(56) References Cited

U.S. PATENT DOCUMENTS 5,825,869 A * 10/1998 Brooks ................. H04M 3/523
                                                    379/265.12
6,188,978 B1   2/2001 Harada
(Continued)

FOREIGN PATENT DOCUMENTS

CN   101483830 A * 7/2009 ............. H04W 4/12

OTHER PUBLICATIONS

Dörbecker, M. et al., ("The Cellular Text Telephone Modem—The Solution for Supporting Text Telephone Functionality in GSM Networks", Acoustics, Speech, and Signal Processing, May 7-11, 2001, pp. 1441-1444, vol. 3, IEEE International Conference, Salt Lake City, Utah).*

(Continued)

*Primary Examiner* — Jinsong Hu
*Assistant Examiner* — Tabla Glomah
(74) *Attorney, Agent, or Firm* — Coats & Bennett PLLC

(57) ABSTRACT

A communication node processes a call supported over a voice coded channel in a wireless communication network. The node tentatively designates the call as a voice call as soon as the call is initiated. While the call is designated as a voice call, the node limits processing of the call as a text telephony call to passively monitoring for one or more partial or complete text characters in the call. Responsive to detecting one or more partial or complete text characters in the call via this passive monitoring, the node designates the call as a text telephony call. While the call is designated as a text telephony call, the node fully processes the call as a text telephony call by passively detecting one or more complete text characters in the call, and conditioning and de-conditioning signals of the call for reliable transmission and reception over the voice coded channel.

24 Claims, 8 Drawing Sheets

(51) Int. Cl.
  *H04M 3/42* (2006.01)
  *H04M 7/00* (2006.01)
  *H04W 76/00* (2009.01)

(56) References Cited

U.S. PATENT DOCUMENTS

| | | | | |
|---|---|---|---|---|
| 6,195,362 | B1* | 2/2001 | Darcie | H04L 12/2801 370/431 |
| 7,133,696 | B2* | 11/2006 | Mauro, II | H04M 3/42 455/507 |
| 7,702,319 | B1* | 4/2010 | Arslan | H04W 4/20 379/88.13 |
| 2004/0228325 | A1* | 11/2004 | Hepworth | H04M 3/42 370/352 |
| 2005/0195801 | A1* | 9/2005 | Chu et al. | H04L 12/66 370/352 |
| 2013/0301085 | A1* | 11/2013 | Jackson | H04N 1/32765 358/434 |

OTHER PUBLICATIONS

Dörbecker, M. et al., ("The Cellular Text Telephone Modem—The Solution for Supporting Text Telephone Functionality in GSM U Networks", Acoustics, Speech, and Signal Processing, May 7-11, 2001, pp. 1441-1444, vol. 3, IEEE International Conference, Salt Lake City, Utah).*

3rd Generation Partnership Project, "Global Text Telephony (GTT); Stage 2", Technical Specification Group Services and System Aspects, Dec. 2009, 3GPP TS 23.226 V9.0.0, Release 9.

So, et al., "Linear Prediction Approach for Efficient Frequency Estimation of Multiple Real Sinusoids: Algorithms and Analyses," IEEE Transactions on Signal Processing, Jul. 2005, pp. 2290-2305, vol. 53, No. 7.

Dörbecker, M. et al., "The Cellular Text Telephone Modem—The Solution for Supporting Text Telephone Functionality in GSM Networks", Acoustics, Speech, and Signal Processing, May 7-11, 2001, pp. 1441-1444, vol. 3, IEEE International Conference, Salt Lake City, Utah.

* cited by examiner

LIMITING PROCESSING OF CALLS AS TEXT TELEPHONY CALLS

TECHNICAL FIELD

The present invention relates generally to text telephony, and particularly relates to processing a text telephony call supported over a voice coded channel in a wireless communication network.

BACKGROUND

Text telephony encompasses transmitting text characters in-band and in real-time between distant parties using telephonic systems and equipment traditionally designed to transmit human speech. By transmitting text characters, instead of or in addition to human speech, text telephony enables deaf, hard of hearing, or speech-impaired people to communicate in a call.

Transporting text characters over a wireless communication network, however, proves challenging. A wireless communication network transports a call over a voice coded channel. A voice coded channel is a channel that is specifically optimized for transporting human speech with an acceptable call quality. A voice coded channel for instance employs lossy compression schemes optimized for transporting human speech by transporting parameters of a speech model instead of a digitized representation of the speech waveform. A voice coded channel therefore saves bandwidth in transporting human speech. In transporting text characters, however, a voice coded channel proves unreliable, with an unacceptable character error rate.

Accordingly, known approaches to addressing this problem condition the signals of all calls in the wireless communication network in a specific way, so that those signals can be reliably transported over the voice coded channel in case they represent text characters. Where the signals represent Baudot encoded text characters, for instance, these known approaches transcode the text characters to be represented with a 4 tone frequency shift keying (FSK) format which is transmitted via sophisticated features such as interleaving and convolutional coding. Represented in this 4 tone FSK format, the text characters can be more reliably transported over the voice coded channel, since the frequency of these 4 FSK tones are more compatible with the speech codec and it also augments the original TTY bit rate from 45.5 bps to 400 bps, providing the needed extra bits (per FSK) for the convolutional coding. Implementing this conditioning, however, proves expensive in terms of processing and memory requirements.

SUMMARY

One or more embodiments herein broadly designate a call as a voice call or a text telephony call and exploit that designation to advantageously reduce the burden on the processing circuits and/or memory of a communication node processing the call. In particular, the embodiments initially designate the call as a voice call, and then limit text telephony processing of that call unless and until the call is designated as a text telephony call. If and when the call is designated as a text telephony call, the call is fully processed as a text telephony call by conditioning signals of the call for reliable transport over a voice coded channel.

This means that the communication node avoids needlessly conditioning signals of calls that are actually voice calls, and thereby reduces the burden on the node's processing circuits and memory. Where the communication node processes multiple calls, reducing the burden on the node's processing circuits and memory for processing a voice call translates in some embodiments into additional capacity for processing even more calls while still providing text telephony call capability.

More generally, embodiments herein include a method performed by a communication node for processing a call supported over a voice coded channel in a wireless communication network. The method includes tentatively designating the call as a voice call as soon as the call is initiated. The method further entails, while the call is designated as a voice call, limiting processing of the call as a text telephony call to passively monitoring for one or more partial or complete text characters in the call. With processing of the call as a text telephony call limited to such passive monitoring, processing excludes (i.e., the communication node refrains from) conditioning and de-conditioning signals of the call for reliable transmission and reception over the voice coded channel. The method however further includes, responsive to detecting one or more partial or complete text characters in the call via this passive monitoring, designating the call as a text telephony call. While the call is designated as a text telephony call, the method entails fully processing the call as a text telephony call. Fully processing the call as a text telephony call means passively detecting for one or more complete text characters in the call, as well as conditioning and de-conditioning signals of the call for reliable transmission and reception over the voice coded channel.

In at least some embodiments, the communication node is configured to process multiple calls and to maintain a pool of shared resources. In this case, the method further entails responsive to detecting one or more partial or complete text characters in a call, releasing resources at the communication node performing limited processing of that call. The method then includes selecting a resource for performing full processing of the call from a pool of shared resources that are available at the communication node for fully processing a subset of the multiple calls processed by the communication node.

Regardless, in one or more embodiments, the communication node sets an initial state of the passive detection to be performed while the call is designated as a text telephony call with a final state of the passive monitoring already performed while the call was designated as a voice call (where a state of passive detection or monitoring includes the data and processing state thereof). This way, any partial or complete text character(s) detected by limited processing of the call (at least in the speech encoding direction) will be treated by full processing of the call and therefore transported reliably over the channel by the full processing's signal conditioning.

In some embodiments, passive monitoring entails monitoring for a complete initial text character in the call. Monitoring for a complete initial text character in this way advantageously achieves an appropriate false designation rate. Additionally or alternatively, the designation of a call as a text telephony call responsive to detection of one or more partial or complete text characters while the call is designated as a voice call is in some embodiments a tentative designation pending confirmation during full processing of the call as a text telephony call.

The communication node in some embodiments monitors for one or more partial or complete text characters from a signal of the call that the node is to transmit over the voice coded channel. In this case, passive monitoring inspects multiple sets of blocks of discrete-time samples from the call in order to identify whether those multiple sets of blocks collectively convey a text character. Specifically, monitoring entails, for each of multiple sets of blocks of discrete-time samples from the call, determining whether that set of blocks conveys a bit of a text character, and if so determining the value of that bit, based on the number of blocks in the set that contain a first text telephony tone, the number of blocks in the set that contain a second text telephony tone, and the number of blocks in the set that do not contain any text telephony tone. Monitoring further includes determining whether the multiple sets of blocks collectively convey a text character based on one or more rules that define a structure for the bit values of a text character.

Alternatively or additionally to monitoring for one or more partial or complete text characters from a signal of the call that the node is to transmit over the voice coded channel, monitoring in some embodiments includes monitoring for a partial text character from a signal of the call that the node has received over the channel (i.e., in the speech decoding direction). More specifically, in one or more of these embodiments, monitoring entails monitoring for a partial text character from a signal of a text telephony call that has leaked through the channel to the communication node without having been conditioned for reliable transport over that channel (e.g., without having been text transcoded, such as with a 4 tone FSK signal).

In this case, monitoring includes estimating a sequence of tones respectively associated with a sequence of frames of the voice coded channel from noisy discrete-time samples of the leaked-through signal. Monitoring then entails estimating a sequence of bit values corresponding to the sequence of tones and determining, based on one or more rules that define a structure for the bit values of a text character, whether the sequence of bit values is characteristic of a partial text character.

In one or more embodiments, one of these rules defines a rigid structure for the bit values of a text character, assuming that the sequence of bit values will be correctly estimated despite the signal leaking through unconditioned. Another one of the rules defines a flexible structure for the bit values of a text character, assuming that at least some of the bit values in the sequence of bit values will be incorrectly estimated due to the signal leaking through unconditioned. By including this flexible structure, the rules prove robust in determining the general presence of a partial text character in the leaked-through signal.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
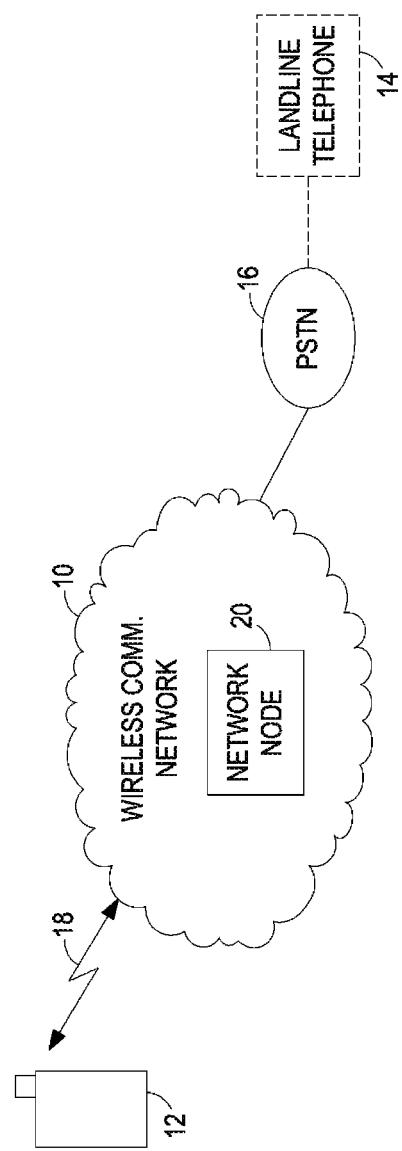
FIG. 1 is a block diagram of a wireless communication device and a wireless communication network that includes a network node configured according to one or more embodiments herein.

FIG. 1 depicts a wireless communication network 10 configured to support a call between a wireless communication device 12 and one or more other communication devices (e.g., landline telephone 14 connected to the public switched telephone network, PSTN, 16). The network 10 in this regard is nominally optimized for the case where the call just comprises human speech. Indeed, the network 10 transports the call to and from the device 12 over a voice coded channel 18 that is optimized for transporting human speech with an acceptable call quality.

In the case where the call additionally or alternatively comprises text characters, the network 10 still transports the call to and from the device 12 over the voice coded channel 18. However, in order for the text characters of the call to be transported with an acceptable character error rate, the signals of the call must be conditioned before transmission over the voice coded channel 18 and de-conditioned upon reception. Where the call comprises Baudot encoded text characters, for instance, conditioning in some embodiments entails the device 12 transcoding the Baudot encoded characters into a 4-tone FSK format with interleaving and convolutional coding for transport to the network 10 over the voice coded channel 18. In this case, de-conditioning entails a node 20 in the network 10 (e.g., a media gateway) recovering the original Baudot encoded characters from the 4-tone FSK format.

Figure 2:
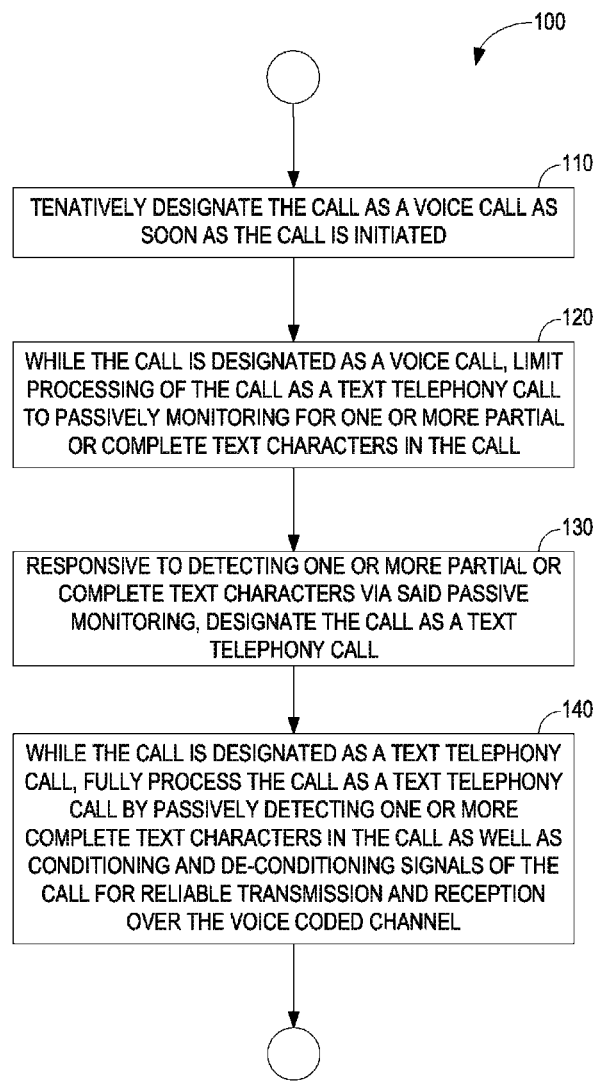
FIG. 2 is a logic flow diagram of a method performed by a communication node for processing a call supported over a voice coded channel in a wireless communication network, according to one or more embodiments.

Conditioning and de-conditioning the call in this way, though, is expensive in terms of the burden that it imposes on the processing circuits and memory at the device 12 and network node 20. Embodiments herein recognize that this expense proves unnecessary unless the call in fact comprises text characters. The embodiments thereby broadly designate the call as a voice call or a text telephony call and exploit that designation to advantageously reduce the burden on the processing circuits and memory of the device 12 and/or network node 20. FIG. 2 illustrates additional details of one such embodiment that includes a method performed by a communication node (e.g., the device 12 or network node 20) for processing a call supported over the voice coded channel 18.

As shown in FIG. 2, the method 100 at the communication node includes tentatively designating the call as a voice call as soon as the call is initiated (Block 110). With this designation occurring as soon as (i.e., immediately or shortly after) the call is initiated, the designation is the first (i.e., initial) time that the call is designated as being of a certain type. And with this initial designation being tentative, the designation is subject to change. Moreover, the designation as a voice call is unconditional because under no circumstances will the call be initially designated as a text telephony call. Indeed, in one or more embodiments, this initial designation of the call is performed as part of a broader strategy at the communication node to initially designate all calls as voice calls, even those that comprise text characters and are therefore actually text telephony calls.

Regardless, FIG. 2 shows that the method 100 further entails, while the call is designated as a voice call, limiting processing of the call as a text telephony call to passively monitoring for one or more partial or complete text characters in the call (Block 120). Monitoring for one or more partial or complete text characters is passive in the sense that monitoring comprises non-destructively processing signals of the call in an attempt to recognize one or more partial or complete text characters in the call, rather than receiving a control signal that explicitly or implicitly indicates whether the call comprise one or more partial or complete text characters. Furthermore, monitoring for a partial text character in at least some embodiments entails monitoring for one or more bits of a text character, where a text character includes not only alphanumeric characters but also a control character at the beginning of a call. Regardless, with processing of the call as a text telephony call limited to such passive monitoring, processing excludes (i.e., the communication node refrains from) conditioning and de-conditioning signals of the call for reliable transmission and reception over the voice coded channel 18.

The method 100 however further includes, responsive to detecting one or more partial or complete text characters in the call via this passive monitoring, designating the call as a text telephony call (Block 130). Since the call was previously designated as a voice call, this involves switching from designating the call as a voice call to designating the call as a text telephony call; that is, the call is re-designated to be a text telephony call. While the call is designated as a text telephony call, the method 100 entails fully processing the call as a text telephony call (Block 140). Fully processing the call as a text telephony call means passively detecting one or more complete text characters in the call, as well as conditioning and de-conditioning signals of the call for reliable transmission and reception over the voice coded channel 18 (respectively). That is, before transmitting signals of the call over the voice coded channel 18, the communication node conditions those signals for reliable transmission over the channel 18. And upon receiving signals of the call over the voice coded channel 18, the communication node de-conditions those signals in order to reliably receive the signals over the channel 18.

The method 100 therefore conditions and de-conditions signals of a call if the call is indeed a text telephony call comprising text characters, and refrains from needlessly conditioning and de-conditioning signals of the call if that call is actually a voice call. Avoiding such needless conditioning and de-conditioning, the method advantageously reduces the burden on the processing circuits and/or memory of the communication node.

In at least some embodiments, for instance, the communication node is configured to selectively instantiate either a "limited processing" resource or a "full processing" resource on an as needed basis in order to process a call as a text telephony call in a limited or full capacity. The limited processing resource is configured to perform limited processing of a call as a text telephony call. In some embodiments, for example, the limited processing resource is a text telephony monitor or detector configured to passively monitor for one or more partial or complete text characters in a call, without performing signal conditioning and de-conditioning. By contrast, a full processing resource is configured to perform full processing of a call as a text telephony call, including signal conditioning and de-conditioning. In some embodiments where the signals of a call conform to the Cellular Text Telephone Modem (CTM) protocol, for instance, a full processing resource is a CTM modem. Unless and until a call is designated as a text telephony call, the node only instantiates a limited processing resource for processing the call. If and when the call is designated as a text telephony call, though, the node instantiates a full processing resource for processing the call and replaces the limited processing resource with the full processing resource.

In one or more embodiments, a limited processing resource imposes a smaller burden on the communication node's processing circuits and memory than that imposed by a full processing resource. For example, a limited processing resource is implemented with fewer software instructions than that with which a full processing resource is implemented. Thus, by instantiating a limited processing resource for processing a voice call and avoiding instantiating a full processing resource for that call, the node's processing circuits and memory have more capacity to perform more calls and/or other tasks while processing the call.

Note that, in at least some embodiments, the communication node processes only a single call. For example, where the communication node comprises the wireless communication device 12, the device 12 processes just one call. Regardless, in such embodiments, reducing the burden on the communication node's processing circuits and memory for processing a voice call does not translate into reducing capacity requirements on the node's processing circuits and memory. Indeed, the node must be configured with processing circuits and memory that have the capacity to process the node's one call as a voice call or as a text telephony call. When the node processes a voice call, the node's processing circuits are burdened less (e.g., in term of millions instructions per second (MIPS) resource), but they must still have had the capacity to handle the call had it been a text telephony call.

In other embodiments, by contrast, the communication node processes multiple calls. For example, where the communication node comprises the network node 20 (e.g., a media gateway), the node 20 in at least some embodiments processes multiple calls. Regardless, in these embodiments, reducing the burden on the node's processing circuits and memory for processing a voice call indeed translates into reducing requirements on the node's processing circuits and memory. Alternatively, this translates into additional capacity for processing even more calls while still providing text telephony call capability (e.g., in accordance with FCC mandate in the US). For example, rather than dedicating a full processing resource to each call, one or more embodiments effectively replace some of those full processing resources deemed unnecessary with more numerous limited processing resources in order to gain capacity for processing additional voice calls while still meeting the demand for processing text telephony calls.

Particularly with regard to this alternative, the node realizes the additional call capacity by maintaining a pool of shared full processing resources. In one or more embodiments where the signals of calls conform to the Cellular Text Telephone Modem (CTM) protocol, for instance, the pool of shared resources is a pool of shared CTM modem resources. Regardless, these shared resources are available at the node for fully processing a subset of the multiple calls processed by the node (where a "subset" herein refers to a smaller portion of a set). Since in practice a greater number of calls are voice calls than text telephony calls, the size of this subset in at least some embodiments is substantially less than (i.e., ≤1% of) the total number of calls processed by the node. Irrespective of the particular subset size, though, shared resources are allocated from the pool on an as needed basis in order to fully process calls that have been designated as text telephony calls. Upon completion of a text telephony call, the shared resource that fully processed that call is released and returned back to the pool for subsequent re-allocation. A shared resource is not allocated to a call unless and until the call is designated as a text telephony call. Indeed, until such designation, only a limited processing resource is allocated to the call for performing limited processing of the call.

Such embodiments realize a quantifiable gain in the node's capacity to process calls. Consider for instance an example where the node's processing circuits comprise one or more digital signal processors (DSPs). In this case, each DSP has the capacity to instantiate processing resources, including limited and/or full processing resources, for processing a number of calls. Absent embodiments herein, any given DSP dedicates a full processing resources for each call, meaning that the DSP has the capacity to process $N_C$ calls:

$$N_C = \frac{M_D}{M_v + M_S + M_C}, \quad (1)$$

where $M_D$, is the number of million instructions per second (e.g., MIPS) that a DSP can execute, $M_v$ is the number of MIPS that the DSP needs to run the speech codec per call, $M_S$ is the number of MIPS that the DSP needs to run the speech processes per call, and $M_C$ is the number of MIPS that the DSP needs to run a full processing resource per call. By contrast, according to one or more embodiments herein, any given DSP allocates a limited processing resource as well as a speech process to each voice call, and allocates a full processing resource to each text telephony call. In this case, the given DSP has the capacity to process $N_L$ calls:

$$N_L = \frac{M_D}{\alpha_S(M_v + M_S + M_L) + (1 - \alpha_S)(M_v + M_C)}, \quad (2)$$

where $M_L$ is the number of MIPS that the DSP needs to execute a limited processing resource per call and $\alpha_S$ is the fraction of voice calls initiated in the DSP as fully loaded. The gain G in call capacity is therefore estimated as:

$$\begin{aligned} G &= \frac{N_L}{N_C} \quad (3) \\ &= \frac{M_v + M_S + M_C}{\alpha_S(M_v + M_S + M_L) + (1 - \alpha_S)(M_v + M_C)} \\ &= \frac{M_v + M_S + M_C}{(M_v + M_S + M_C) - ((1 - \alpha_S)M_S + \alpha_S(M_C - M_L))} \\ &= \frac{1}{1 - \frac{(1 - \alpha_S)M_S + \alpha_S(M_C - M_L)}{(M_v + M_S + M_C)}} \end{aligned}$$

Notably, this gain G is always greater than 1, since the second term in the denominator is positive and has a value of less than 1.

Of course, despite this increased capacity for processing calls, any given DSP may still reach capacity and not be able to process a newly initiated call. In at least some embodiments, therefore, this new call will be processed by another DSP at the communication node that still has capacity.

In one embodiment, the communication node sets an initial state of the passive detection to be performed while the call is designated as a text telephony call with a final state of the passive monitoring already performed while the call was designated as a voice call (where a state of passive monitoring includes the data and processing state thereof). This way, any text characters detected by limited processing of the call will be considered as detected by full processing of the call and therefore transported reliably over the channel 18 by the full processing's signal conditioning.

Figure 3:
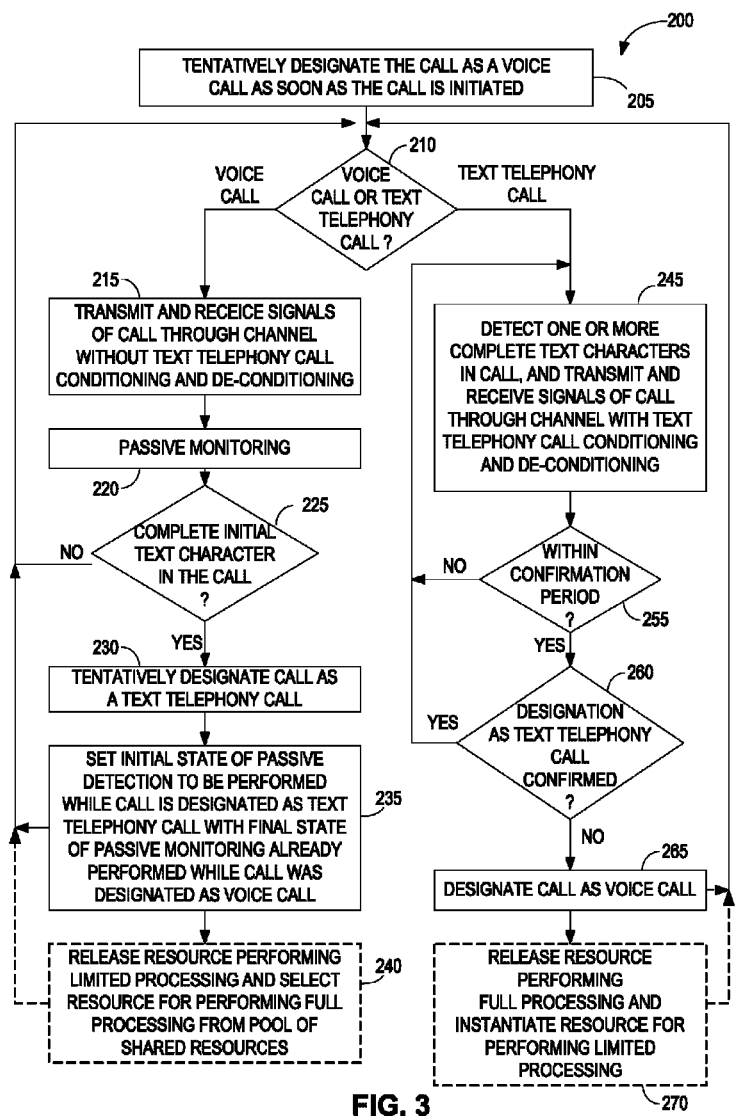
FIG. 3 is a logic flow diagram illustrating additional details of the method in FIG. 2, according to one or more embodiments.

In some embodiments, an appropriate false designation rate is achieved by passively monitoring for a complete initial text character before designating a call as a text telephony call. Moreover, in one embodiment, the false designation rate is retroactively rejected or suppressed by requiring that any text telephony designation made during limited processing be confirmed next by the full processing, i.e., limited processing text telephony designations are merely tentative designations. FIG. 3 illustrates the details of such an embodiment, as well as the details of one or more other embodiments herein.

As shown in FIG. 3, the communication node tentatively designates a call as a voice call as soon as the call is initiated (Block 205). With the call initially designated as a voice call ("Voice Call" at Block 210), the node transmits and receives signals of the call through the voice coded channel 18 without conditioning and de-conditioning those signals for reliable transport (Block 215). Meanwhile, the node passively monitors for a complete initial text character in the call (Block 220). While a complete initial text character is not detected (NO at Block 225), the node continues to limit processing of the call as a text telephony call in this way. However, if and when a complete initial text character is detected (YES at Block 225), the node tentatively designates the call as a text telephony call, pending confirmation during full processing of the call as a text telephony call (Block 230). In order to ensure reliable transmission of that complete initial text character, the node sets an initial state of passive detection to be performed while the call is designated as a text telephony call with the final state of passive monitoring already performed while the call was designated as a voice call (Block 235). This way, the complete initial text character will be treated as detected by the full processing of the call as a text telephony call and will therefore be transmitted reliably with signal conditioning. And in those embodiments where the node maintains a pool of shared full processing resources, the node releases resources performing limited processing of the call and selects a resource for performing full processing of the call from that pool (Block 240).

With the call now at least tentatively designated as a text telephony call ("Text Telephony Call" at Block 210) and with the initial state of passive detection to be performed set to the final state of the passive monitoring already performed, the node passively detects one or more (e.g., subsequent) complete text characters in the call and reliably transports those characters over the voice coded channel 18, as the node transmits and receives signals of the call through the channel 18 for reliable transport (block 245). Detection may entail for instance performing baudot character detection in the speech encoding direction and CTM character demodulation in the speech decoding direction. That said, the node's full processing of the call in this way is probationary until passive monitoring confirms the call is in fact a text telephony call.

Specifically in this regard, the node determines whether or not it is within a confirmation period (Block 255). In at least some embodiments, this confirmation period begins when a call is tentatively designated as a text telephony call and continues for a maximum duration of text telephony call negotiation (e.g., 4 seconds). Regardless, if the node is within the confirmation period (YES at Block 255), then the node determines whether the call's designation as a text telephony call has been confirmed by the full processing. If the call's designation is not confirmed by the end of the confirmation period (NO at Block 265), then the current designation is deemed a false designation and the call is re-designated to a voice call again (Block 265). In those embodiments where the node maintains a pool of shared full processing resources, the node releases the shared resource performed full processing of the call and instantiates a resource for performing limited processing again (Block 270). Processing of the call then continues as before, without signal conditioning and de-conditioning. On the other hand, if the call's designation is indeed confirmed by the end of the confirmation period (YES at Block 265), then full processing of the call continues with signal conditioning and de-conditioning. Then, later, when the node is no longer in the confirmation period (NO at Block 255), the node unconditionally performs full processing of the call as a text telephony call, meaning that a full processing resource is allocated to the call for the rest of the call's duration.

Figure 4:
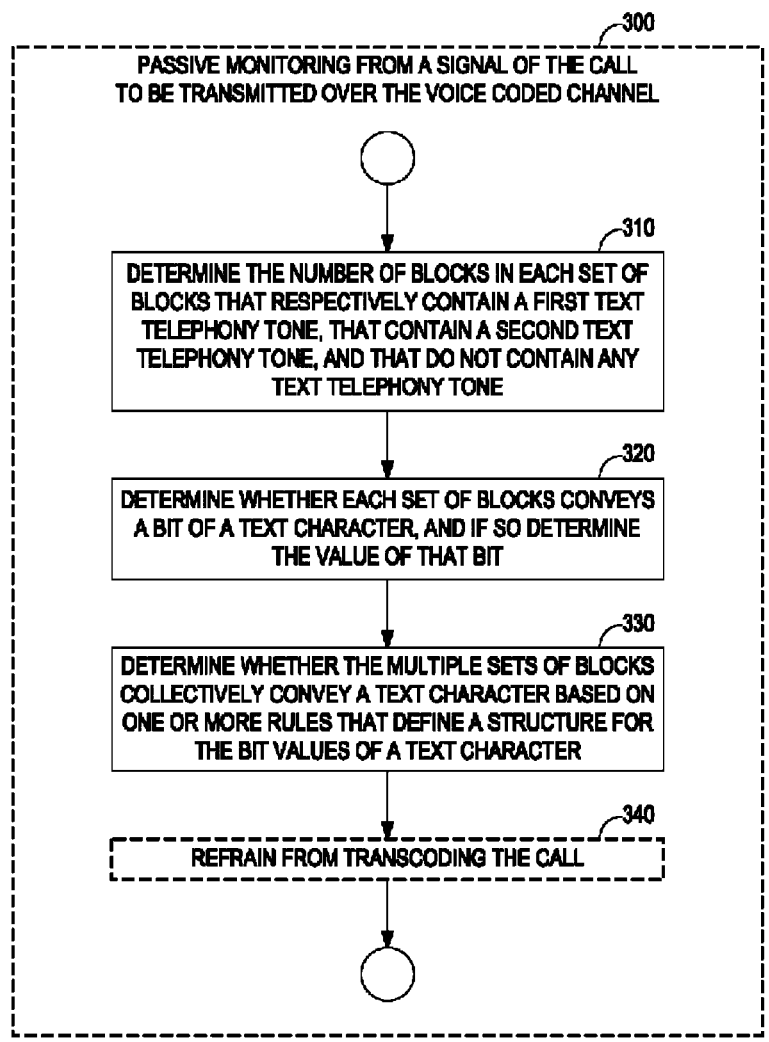
FIG. 4 is a logic flow diagram illustrating passive monitoring for one or more partial or complete text characters from a signal of a call to be transmitted over a voice coded channel, according to some embodiments.

The communication node in some embodiments passively monitors for one or more partial or complete text characters from a signal of the call that the node is to transmit over the voice coded channel 18. FIG. 4 illustrates additional details of such passive monitoring according to at least one embodiment.

In the embodiment of FIG. 4, passive monitoring inspects multiple sets of blocks of discrete-time samples from the call in order to identify whether those multiple sets of blocks collectively convey a text character. Specifically, for each set of blocks, the node determines the number of blocks in the set that contain a first text telephony tone, the number of blocks in the set that contain a second text telephony tone, and the number of blocks in the set that do not contain any text telephony tone (Block 310). The node then determines whether that set of blocks conveys a bit of a text character, and if so determines the value of that bit, based on the number of blocks containing the first tone, second tone, and no tone (Block 320). Having determined if and what bit of a text character each of the sets of blocks convey, the node determines whether the multiple sets of blocks collectively convey a text character based on one or more rules that define a structure for the bit values of a text character (Block 330).

Note that in some embodiments text character detection when the call is designated as a text telephony call involves text transcoding of the call (e.g., from one text character format to another). However, in at least some embodiments herein, the communication node refrains from performing text transcoding of the call (Block 340) as part of text character monitoring when the call is designated as a voice call. Thus, passive monitoring in this case consists of (i.e., exclusively entails) determining whether the multiple sets of blocks collectively convey a text character as described above, without then transcoding that text character into a different format.

Consider a specific example of FIG. 4 where a text telephony call comprises a Global Text Telephony (GTT) call with Baudot encoded Teletypewriter (TTY) characters. In this case, the TTY Baudot signal to be transmitted is an FSK signal composed of a sequence of two frequency tones, namely 1400 Hz and 1800 Hz. A frequency tone of 1400 Hz represents a binary bit with a value of 1, while a frequency tone of 1800 Hz represents a binary bit with a value of 0. Each frequency tone has a duration of 20 ms (for a 50 bits/s transmission) or 22.5 ms (for a 45.5 bits/s transmission). TTY characters are represented with a certain defined structure of bit values. Specifically, each TTY character is represented with 5 bit values, with different characters being represented by different sets of bit values. Each TTY character is preceded by a start bit (e.g., a bit with a value of 0) and followed by one or more stop bits (e.g., a bit with a value of 1).

Passive monitoring from such a signal involves three stages. These three stages, in at least some embodiments, resemble character detection performed during full processing, e.g., according to the GTT standard. Regardless, the three stages include: "TTY Block Classification", "TTY Block to TTY Bit Classification", and "TTY Bit to TTY Character Classification". "TTY Block Classification" entails dividing every 160 samples of Pulse Code Modulation (PCM) data into 10 blocks of 16-sample data. Each block (also referred to as a dit) is classified as one of three different types of blocks: NON_TTY, LOGIC_0, and LOGIC_1. A NON_TTY block is a block that contains no TTY tone. A LOGIC_0 block is a block that contains an 1800 Hz tone. A LOGIC_1 block is a block that contains a 1400 Hz tone. This classification is based on comparing and thresholding energy (derived via Discrete Fourier Transform) at 1400 Hz or 1800 Hz to the energy of a complete block of 16-sample data.

The "TTY Block to TTY Bit Classification" stage receives a sequence of blocks classified by the "TTY Block Classification" stage. The blocks in this sequence are evaluated sequentially within a searching window. The blocks evaluated within any given searching window is referred to as a set of blocks. The communication node determines if this set of blocks conveys a bit of a TTY character and if so to determine the value of that bit. Specifically, the set of blocks is classified as either a TTY binary bit with a value of 1, a TTY binary bit with a value of 0, or neither of the above (i.e., TTY UNKNOWN). The set of blocks is classified as a TTY binary bit with a value of 1 if the set includes a minimum of 6 blocks that were classified as LOGIC_1 blocks, includes a maximum of 2 blocks that were classified as LOGIC_0 blocks, and includes a maximum of 5 blocks that were classified as NON_TTY blocks. Conversely, the set of blocks is classified as a TTY binary bit with a value of 0 if the set includes a minimum of 6 blocks that were classified as LOGIC_0 blocks, includes a maximum of 2 blocks that were classified as LOGIC_1 blocks, and includes a maximum of 5 blocks that were classified as NON_TTY blocks. Finally, the set of blocks is classified as TTY UNKNOWN if the block cannot be classified as a TTY binary bit.

Finally, the "TTY Bit to TTY Character Classification" stage receives a sequence of the sets of blocks classified by the "TTY Block to TTY Bit Classification" stage. This sequence is evaluated and classified as a TTY character based on one or more rules that define a structure for the bit values of a TTY character. For example, one rule specifies that the start bit of a TTY character must be a TTY binary bit with a value of 0. Another rule specifies that the start bit must be followed by 5 TTY binary bits each having a value of 0 or 1. Yet another rule specifies that these 5 bits must be followed by one or more stop bits (i.e., TTY binary bits that have a value of 1). Still another rule specifies that the length of a candidate TTY character, in blocks, must be within a minimum threshold and a maximum threshold. Finally, another rule specifies that the total number of TTY bits with an UNKNOWN classification must be less than a defined threshold. If the sequence is classified as a TTY character, then such amounts to detecting a TTY character in the call, meaning that the call will be designated as a text telephony call.

Text character detection when the call is designated as a text telephony call subsequently includes a "TTY Character to T140 Character Encoding" stage. In this stage, each detected TTY character (in 5-bit Baudot encoded format) is transcoded or otherwise mapped to a Universal T140 character format (an 8 bit encoded format). However, in at least some embodiments, text character monitoring when the call is designated as a voice call excludes this transcoding stage.

Alternatively or additionally to monitoring for one or more partial or complete text characters from a signal of the call that the node is to transmit over the channel 18, monitoring in some embodiments includes monitoring for a partial text character from a signal of the call that the node has received over the channel 18. More specifically, in one or more of these embodiments, monitoring entails monitoring for a partial text character from a signal of a text telephony call that has leaked through the channel 18 to the communication node without having been conditioned for reliable transport over that channel 18.

In one embodiment, for instance, both the wireless communication device 12 and the network node 20 process a call as described herein. When the device 12 initially designates a text telephony call as a voice call, the device 12 transmits a signal of the call to the network node 20 without conditioning the signal for reliable transport over the voice coded channel 18. The signal is considered to have "leaked" through the channel 18 without conditioning. Indeed, although the signal to follow will eventually be conditioned since it conveys text characters of a text telephony call, the beginning part of the signal has not been conditioned immediately since the device 12 requires at least a small amount of time to detect a partial or a complete text character before actually designating the call as a text telephony call.

The network node 20 will not be able to specifically and reliably decipher text characters from the leaked-through signal, since the text characters will have been distorted by the voice coded channel 18 without signal conditioning. Nonetheless, the node 20 herein advantageously monitors for a partial text character in at least a general sense from the leaked-through signal. In some embodiments, for instance, the node 20 monitors for the general presence of a partial text character, without attempting to determine the specific values of that text character. Regardless, when the node 20 detects a partial text character in at least a general sense from the leaked-through signal, the node 20 designates the call as a text telephony call. Meanwhile, when the device 12 detects one or more text partial or complete characters from the signal that it is transmitting through the channel 18, the device 12 itself designates the call as a text telephony call and begins conditioning the signal for reliable transport. Of course, the same can be said for the node 20 transmitting a signal of the call to the device 12.

In at least some embodiments, passive monitoring from a signal transmitted through the channel 18 (i.e., in the speech encoding direction) is asymmetric from passive monitoring from a signal received through the channel 18 (i.e., in the speech decoding direction), at least in terms of partial or complete text character monitoring. In one embodiment, for example, the node 20 monitors for a complete text character from a signal to be transmitted through the channel 18, while monitoring for a partial text character from a signal received through the channel 18. The same can be said for the device 12. This way, only a partial text character is allowed to be leaked through the channel 18 without signal conditioning.

Figure 5:
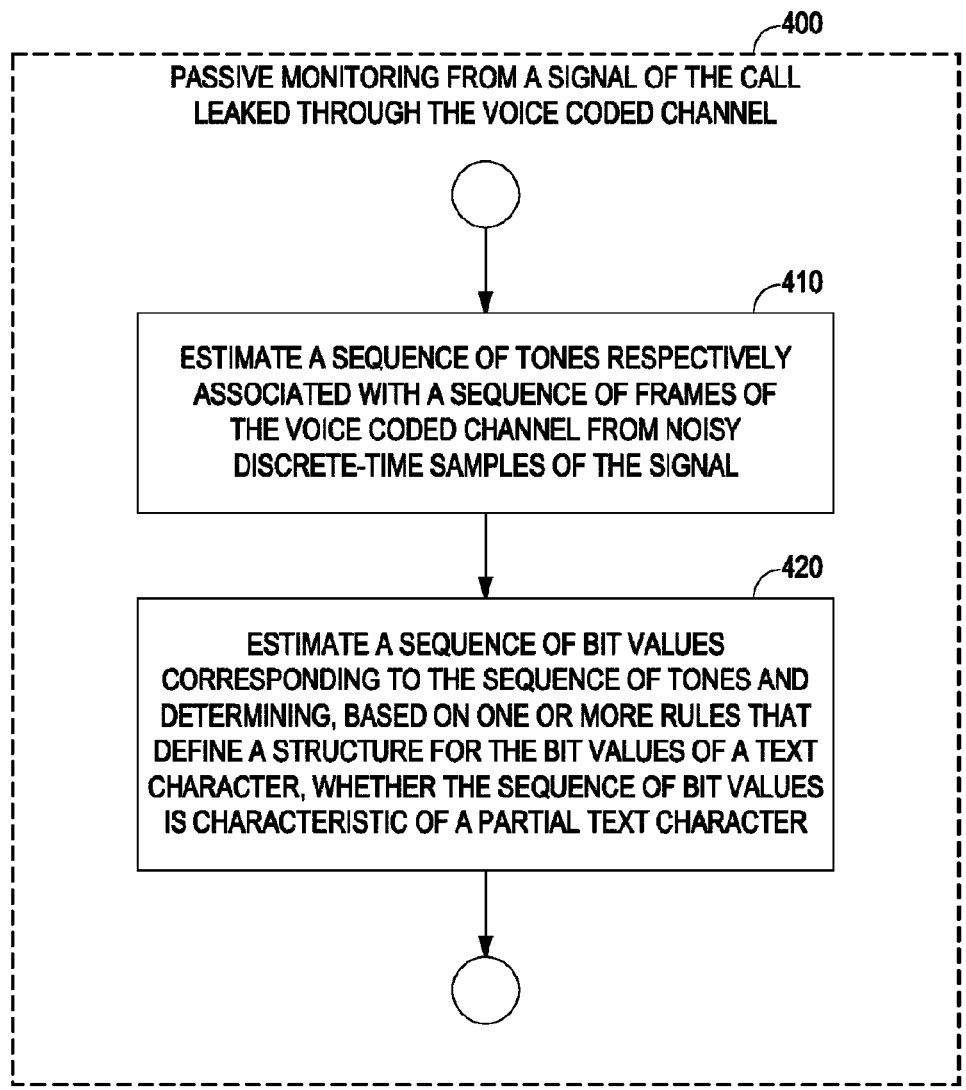
FIG. 5 is a logic flow diagram illustrating passive monitoring for a partial text character from a signal of a call leaked through a voice coded channel, according to some embodiments.

Regardless, passively monitoring for a partial text character from a signal leaked through the voice coded channel 18 proves more challenging than passively monitoring for one or more partial or complete text characters from a signal to be transmitted through the channel 18, since a partial text character will be distorted in the leaked-through signal by the speech encoding. FIG. 5 illustrates at least some embodiments for performing this passive monitoring.

As shown in FIG. 5, monitoring 400 by a communication node includes estimating a sequence of tones respectively associated with a sequence of frames of the voice coded channel 18 from noisy discrete-time samples of the leaked-through signal (Block 410). Monitoring 400 then entails estimating a sequence of bit values corresponding to the sequence of tones and determining, based on one or more rules that define a structure for the bit values of a text character, whether the sequence of bit values is characteristic of a partial text character (Block 420).

The sequence of tones may be estimated using any number of possible approaches, whether parametric or non-parameteric. In at least some embodiments, though, the sequence of tones is estimated using linear prediction property estimation. In one embodiment, for example, Prony estimation is used to estimate the tone sequence by extracting information from uniform samples of the leaked-through signal and building a series of modulated sinusoids. More specifically, the leaked-through signal x(n) sampled at n is modeled as:

$$x(n) = a(n) \cdot \cos(\omega_0 n + \phi) + q(n), \quad (4)$$

where a(n) is a slowly varying amplitude modulation resulting from the signal having been voice encoded, $\omega_0$ is the tone of the signal, $\phi$ is the phase shift of the tone, and q(n) is the additive random noise component. Based on the linear predictive property, x(n) is filtered to yield an error function e(n) of the form:

$$e(n) = x(n) - 2 \cdot \cos(\phi) \cdot x(n-1) + x(n-2), \quad (5)$$

where $\phi$ is the frequency of the tone to be estimated. The frequency estimate $\hat{\omega}_0$, which minimizes the sum of square of e(n), is determined as:

$$\hat{\omega}_0 = \underset{\varphi}{\operatorname{argmin}} \left[ \sum_{n=3}^{N} e^2(n) \right] = \cos^{-1}\left( \frac{\sum_{n=3}^{N} x(n-1) \cdot (x(n) + x(n-2))}{2 \sum_{n=3}^{N} x^2(n-1)} \right). \quad (6)$$

That said, the estimate $\hat{\omega}_0$ is biased, since its value is function of the noise q(n) as well as the modulation term a(n). The expected bias is therefore determined via the following estimation:

$$E\{e^2(n)\} = E\{[x(n) - 2\cos(\phi) \cdot x(n-1) + x(n-2)]^2\}. \quad (7)$$

Regardless of the particular approach used for leaky tone estimation, the result is a sequence of detected tones $\{\hat{\omega}_0(1), \hat{\omega}_0(2), \ldots\}$. The communication node estimates a bit value sequence corresponding to the tone sequence and determines whether the bit value sequence is characteristic of a partial text character being generally present.

In at least some embodiments, this involves two components or stages, namely a continuity detection stage and a constraint detection stage. In the continuity detection stage, the communication node makes sure that the detected tone sequence is continuous (i.e., one tone after the other without gaps) and the tones in the sequence are all bounded between the two frequencies of the text telephony tones (e.g., between 1400 Hz and 1800 Hz). If this is the case, the constraint detection stage estimates a corresponding bit value sequence and determines whether the bit value sequence complies with certain constraints or rules that define what bit value structure is characteristic of a text character.

In one or more embodiments, one of these rules defines a rigid structure for the bit values of a text character, assuming that the sequence of bit values will be correctly estimated despite the signal leaking through unconditioned. Another one of the rules defines a flexible structure for the bit values of a text character, assuming that at least some of the bit values in the sequence of bit values will be incorrectly estimated due to the signal leaking through unconditioned. By including this flexible structure, the rules prove robust in determining the general presence of a text character in the leaked-through signal.

Consider example rules that exploit the unique location and permutation of the bit values in a sequence characteristic of a Baudot encoded TTY character. Specifically in this regard, a bit value sequence for a Baudot encoded TTY character always starts with a start bit that has a value of 0 (i.e., an 1800 Hz tone). Moreover, the bit value sequence for a Baudot encoded TTY character always has at least a certain number of bit value transitions (i.e., transitions between 1400 Hz and 1800 Hz).

Accordingly, a rule that defines a rigid structure for the bit values of a text character specifies that a bit value sequence represents a text character if (a) the first bit value in the sequence is a start bit (i.e., 1800 Hz); and (b) there is at least one bit value transition among the bit values in the sequence after the start bit (i.e., at least one transition between 1400 Hz and 1800 Hz after the start bit). By contrast, a rule that defines a flexible structure for the bit values of a text character accounts for the fact that some of the tones in the sequence may not be recognizable as a bit value of a text character (i.e., a 1400 Hz or 1800 Hz tone used for text telephony) and/or some of the tones in the sequence may be erroneously recognized as the wrong bit value (i.e., 1800 Hz instead of 1400 Hz). Thus, a rule that defines a flexible structure specifies that a bit value sequence represents a text character if (a) the number of detected character bits (1800 Hz or 1400 Hz) is equal or greater than three; and (b) if there is at least one bit value transition among the bit values in the sequence after the start bit (i.e., at least one transition between 1400 Hz and 1800 Hz after the start bit). Such a flexible-structure rule robustly detects the general presence of a text character even if the text character's start bit is not recognizable in the leaked-through signal.

Figure 6A:
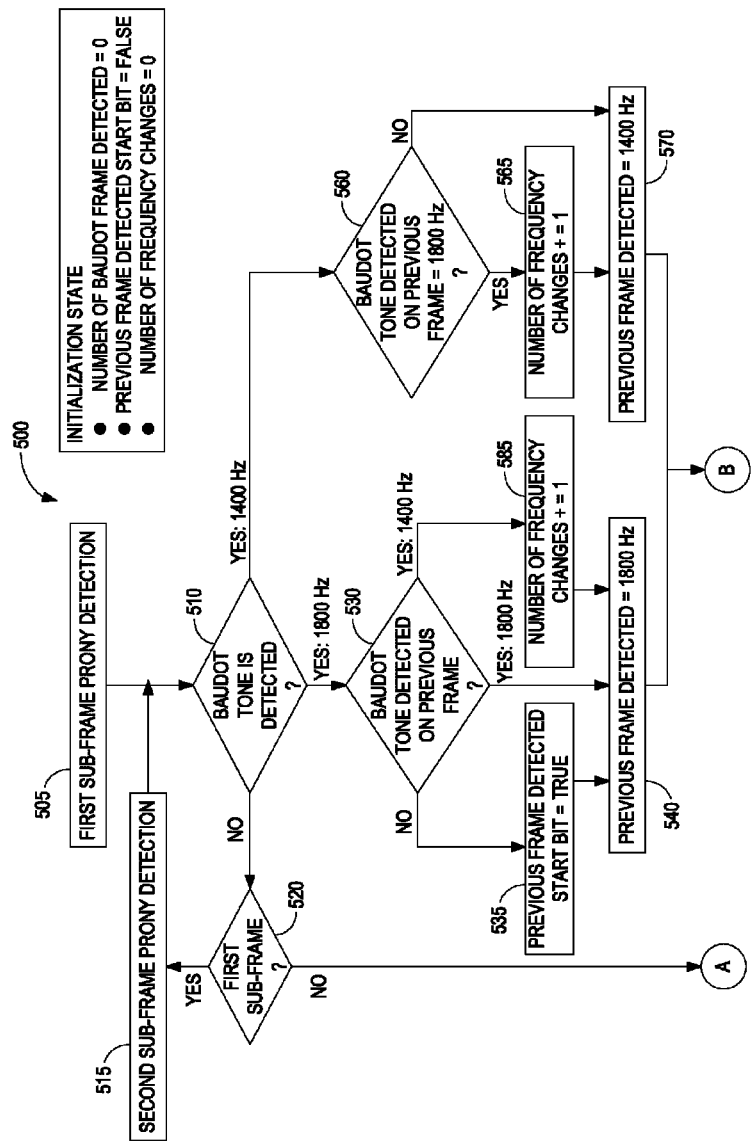
FIG. 6 is a logic flow diagram illustrating exemplary details of the passive monitoring in FIG. 5, according to one or more embodiments.
Figure 6B:
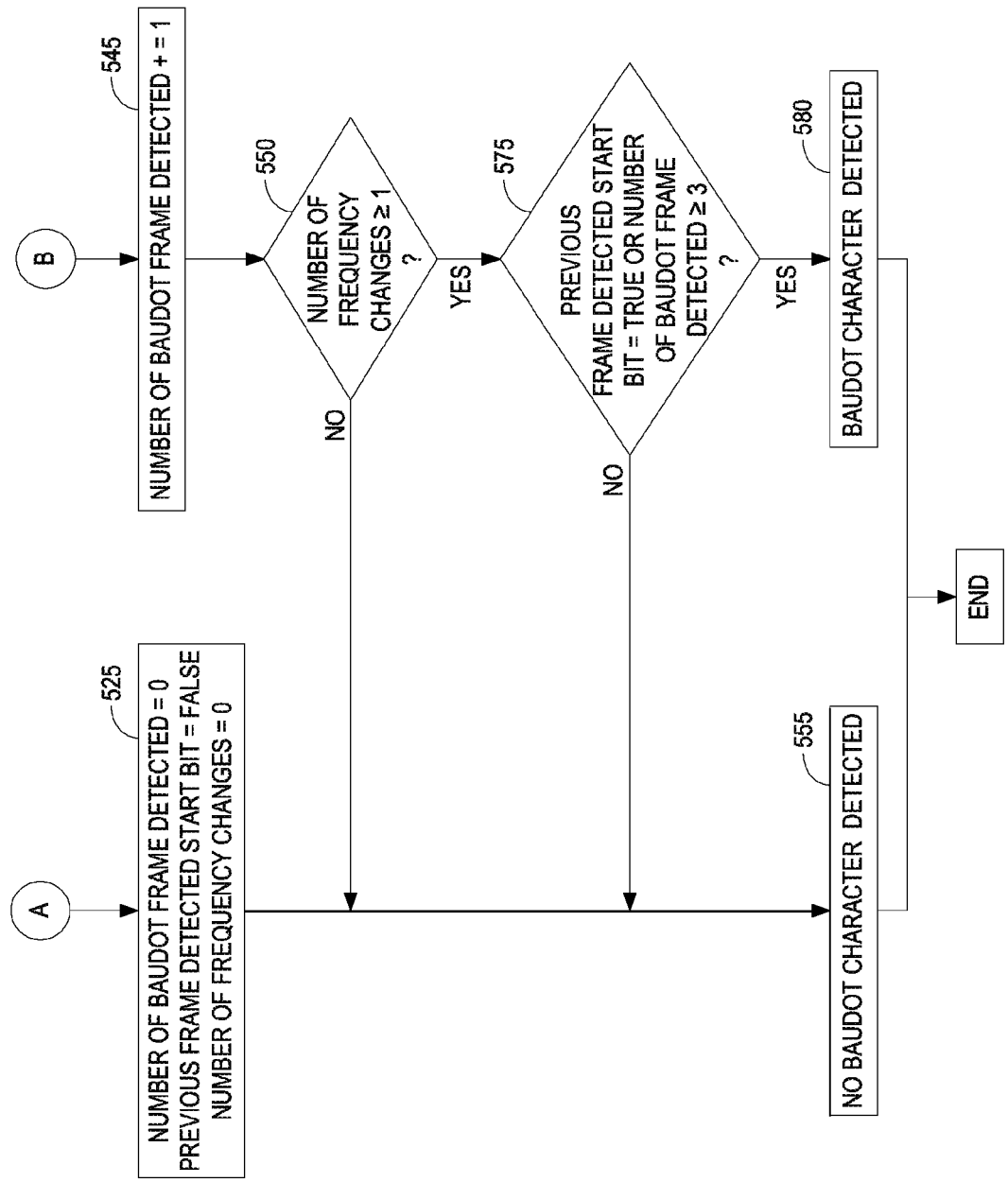

FIG. 6 illustrates detailed decision logic 500 implementing these example rules in the context of embodiments that employ Prony tone estimation on a subframe basis. That is, even though the tones of Baudot encoded TTY characters each have a duration of approximately 20 ms (defining a frame), the embodiments in FIG. 6 nonetheless estimate the tone sequence with an estimation resolution of 10 ms (defining a subframe). This proves advantageous, for instance, where the framing is asynchronous between the wireless communication device 12 and the network node 20, such that frame boundaries at the device 12 and node 20 are not aligned.

As shown, the decision logic maintains a number of state variables for determining whether a sequence of frames is characteristic of a partial Baudot encoded TTY character. These variables include "Number of Baudot frames detected", "Previous frame detected start bit", and "Number of frequency changes".

A frame is associated for tone estimation purposes with two subframes, which may or may not be time-aligned with the frame. Prony tone estimation is employed to detect the tone of a first one of the subframes (Block 505). If the detected tone is not a Baudot tone (i.e., 1400 Hz or 1800 Hz) (NO at Block 510), then Prony tone estimation is employed to detect the tone of the second subframe (Block 515). If the detected tone is still not a Baudot tone (NO at Block 510 and 520), then the sequence of frames is determined as not being characteristic of a Baudot encoded TTY character (block 555) and the state variables are re-initialized (Block 525). If the detected tone for either of the two subframes is a Baudot tone, though, then the tone is considered as having been detected for the associated frame.

Consider first FIG. 6's implementation of a rule that defines a rigid structure for the bit values of a text character. Where this rule is met, the first frame in the sequence will represent the start bit with a tone of 1800 Hz, and there will be at least one frame transition between 1400 Hz and 1800 Hz. FIG. 6 implements this rule by tracking when the first frame in a sequence has a tone of 1800 Hz (YES: 1800 Hz at Block 510, and NO at Block 530). When this occurs, FIG. 6 sets the variable "previous frame detected start bit" to true (Block 535), sets the variable "previous frame detected" to 1800 Hz (Block 540), and increments the variable indicating the number of Baudot frames that have been detected (Block 545). Since only the start bit has been detected at this point, FIG. 6 will not have detected any frequency changes yet (NO at Block 550) and will therefore not yet declare a Baudot character to have been detected (Block 555).

However, if the next frame is detected as having a tone of 1400 Hz (YES: 1400 Hz at Block 510, and YES at Block 560), then FIG. 6 increments the variable indicating the number of frequency changes detected (Block 565). This means that a Baudot character will be detected (Block 580), since the number of frequency changes is at least 1 (YES at Block 550) and the start bit has been previously detected (YES at Block 575).

FIG. 6 will also detect a Baudot character if there is any frequency change after having detected the start bit, even if the change does not occur right after the start bit. FIG. 6 realizes this functionality by incrementing the number of frequency changes detected (Block 585) when an 1800 Hz tone frame is detected (YES:1800 Hz at Block 510) after having just detected an 1400 Hz tone frame (YES:1400 Hz at Block 530). Similarly, FIG. 6 increments the number of frequency changes detected (Block 565) when a 1400 Hz tone frame is detected (YES: 1400 Hz at Block 510) after having just detected an 1800 Hz tone frame (YES at Block 560).

Consider next FIG. 6's implementation of a rule that defines a flexible structure for the bit values of a text character. Where this rule is met, at least three frames with a tone of 1400 or 1800 Hz will have been detected, and there will be at least one frame transition between 1400 Hz and 1800 Hz. FIG. 6 implements this rule by tracking the number of Baudot frames detected (Block 545) When the number of detected frames becomes greater than 3 (YES at Block 575), and there has been at least one frequency change (YES at Block 550), FIG. 6 detects a Baudot character (Block 580).

Those skilled in the art will appreciate that while various embodiments herein were described in the context of Baudot encoded characters, no particular text telephony protocol is necessary for practicing the present invention. That is, a text telephony call may utilize any one of a number of different protocols, including for instance Global Text Telephony, V.21/text telephone version, European Deaf Telephone (EDT), Baudot @ 50 baud, Baudot @ 45.45 baud, or the like. Similarly, no particular wireless communication protocol is necessary for practicing the present invention. That is, the wireless communication network 10 may be any one of a number of standardized wireless networks, including for instance GSM, UMTS, GPRS, long term evolution (LTE), etc.

Those skilled in the art will also appreciate that, where the communication node comprises network node 20, the node 20 in some embodiments is located in a core network of the wireless communication network 10. In one embodiment, for example, the network node 20 is a media gateway that interconnects the PSTN 16 with the wireless communication network 10. In other embodiments, though, the network node 20 is located in an access network of the wireless communication network 10. In one embodiment, for instance, the network node 20 is or is associated with a base station controller (BSC) in the access network.

Regardless, text telephony call processing in at least some embodiments is incorporated into all transcoding points in the wireless communication network 10. This way, no text telephony call capability information needs to be signaled to the network 10 by a wireless communication device 12.

In one or more embodiments, the communication node itself includes a voice encoder and voice decoder realizing the voice encoded channel 18. In at least some embodiments, though, the communication node is functionally and/or physically separated from the node that implements voice encoding and decoding.

Moreover, as shown, the device 12 itself physically includes a user interface (e.g., a keyboard and a display or printer) for receiving text characters as input from a user and for outputting text characters to the user, and one or more processing circuits for transmitting and receiving those text characters over the voice coded channel 18. In other embodiments, though, the device 12 includes an associated text telephony module that includes one or both of the user interface and processing circuits described.

Figure 7:
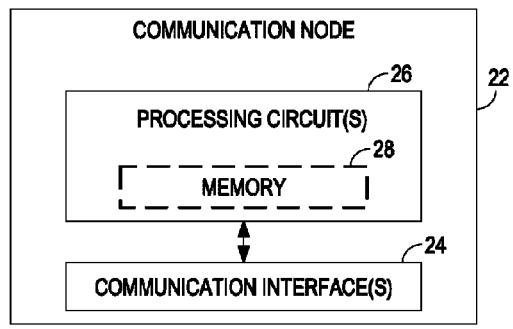
FIG. 7 is a block diagram of a communication node configured to process a call supported over a voice coded channel in a wireless communication network, according to one or more embodiments.

In view of the above modifications and variations, those skilled in the art will appreciate that a communication node herein is generally depicted as shown in FIG. 7 for processing a call supported over a voice coded channel 18 in a wireless communication network 10. The communication node 22 includes one or more communication interfaces 24 and one or more processing circuits 26. The one or more communication interfaces 24 are configured to transmit and receive signals of the call over the voice coded channel 18. The one or more processing circuits 26, e.g., in cooperation with memory 28, are configured to tentatively designate the call as a voice call as soon as the call is initiated. While the call is designated as a voice call, the one or more processing circuits are configured to limit processing of the call as a text telephony call to passively monitoring for one or more partial or complete text characters in the call. Responsive to detecting one or more partial or complete text characters in the call via said passive monitoring, the one or more processing circuits are configured to designate the call as a text telephony call. While the call is designated as a text telephony call, the one or more processing circuits are configured to fully process the call as a text telephony call by passively detecting one or more complete text characters in the call as well as conditioning and de-conditioning signals of the call for reliable transmission and reception over the voice coded channel 18.

Figure 8:
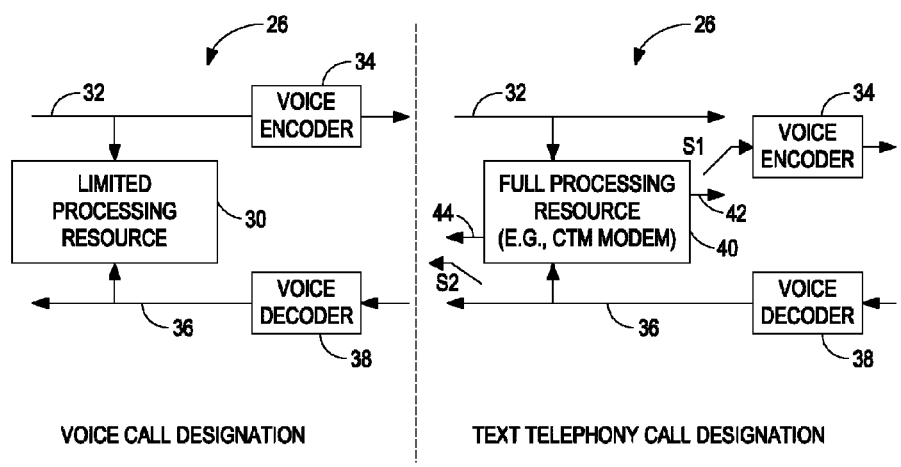
FIG. 8 is a block diagram of processing resources instantiated by the one or more processing circuits of the communication node of FIG. 7, according to some embodiments.

In at least some embodiments, the communication node's processing circuit(s) 26 (in cooperation with memory 28) realize this limited and full processing of a call as a text telephony call by respectively instantiating limited and full processing resources, as described above. FIG. 8 illustrates the one or more processing circuit's instantiation in this regard, for when a call is designated as a voice call and when a call is designated as a text telephony call. FIG. 8 illustrates this in a context where text characters are monitored both from a signal of the call to be transmitted over the voice coded channel 18 and from a signal of the call received over the voice coded channel 18.

As shown in FIG. 8, the one or more processing circuits 26 instantiate a limited processing resource 30 to process a call as a text telephony call in a limited capacity, while the call is designated as a voice call. The limited processing resource 30 passively monitors for one or more text partial or complete characters from a signal 32 of the call to be transmitted over the voice coded channel 18, as realized by voice encoder 34. The limited processing resource 30 also passively monitors for a partial text character from a signal 36 of the call received over the voice coded channel 18, as realized by voice decoder 38.

If and when the call is re-designated as a text telephony call, the one or more processing circuits 26 replace instantiation of the limited processing resource 30 with instantiation of a full processing resource 40 (e.g., a CTM modem). The full processing resource 40 as compared to the limited processing resource 30 also conditions the signal 32 of the call to be transmitted for reliable transmission over the voice encoded channel 18. The full processing resource 40 provides this conditioned signal 42 to the voice encoder 34, via a switch 51 configured to dynamically switch between the unconditioned signal 32 and the conditioned signal 42. Likewise, the full processing resource 40 as compared to the limited processing resource 30 also de-conditions the signal 36 of the call received over the voice encoded channel 18. The full processing resource 40 provides the de-conditioned signal 44 to one or more additional circuits (not shown), via a switch S2 configured to dynamically switch between the received signal 36 and the de-conditioned signal 44.

Those skilled in the art will appreciate that the various "circuits" and "resources" described may refer to a combination of analog and digital circuits, and/or one or more processors configured with software stored in memory and/or firmware stored in memory that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, the present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method performed by a communication node for processing a call supported over a voice coded channel in a wireless communication network, the method comprising:
   tentatively designating the call as a voice call as soon as the call is initiated;
   while the call is designated as a voice call, limiting processing of the call as a text telephony call to passively monitoring for one or more partial or complete text characters in the call;
   responsive to detecting one or more partial or complete text characters in the call via said passive monitoring, designating the call as a text telephony call; and
   while the call is designated as a text telephony call, fully processing the call as a text telephony call by passively detecting one or more complete text characters in the call as well as conditioning and de-conditioning signals of the call for reliable transmission and reception over the voice coded channel;

wherein the communication node is configured to process multiple calls, and wherein the method further comprises, responsive to said detection via said passive monitoring, releasing resources at the communication node performing said limited processing and selecting a resource for performing said fully processing from a pool of shared resources that are available at the communication node for fully processing a subset of the multiple calls processed by the communication node.

2. The method of claim 1, wherein the pool of shared resources is a pool of shared Cellular Text Telephone Modem (CTM) modem resources.

3. The method of claim 1, wherein resources at the communication node comprise processing resources instantiated by one or more digital signal processors at the communication node.

4. The method of claim 1, further comprising setting an initial state of the passive detection to be performed while the call is designated as a text telephony call with a final state of the passive monitoring already performed while the call was designated as a voice call.

5. The method of claim 1, wherein passively monitoring for one or more partial or complete text characters in the call consists of:
   for each of multiple sets of blocks of discrete-time samples from the call, determining whether that set of blocks conveys a bit of a text character, and if so determining the value of that bit, based on the number of blocks in the set that contain a first text telephony tone, the number of blocks in the set that contain a second text telephony tone, and the number of blocks in the set that do not contain any text telephony tone; and
   determining whether said multiple sets of blocks collectively convey a partial or complete text character based on one or more rules that define a structure for the bit values of a text character.

6. The method of claim 1, wherein passively monitoring for one or more partial or complete text characters in the call comprises passively monitoring for a partial text character from a signal of the call received over the voice coded channel by the communication node.

7. The method of claim 1, wherein passively monitoring for one or more partial or complete text characters in the call comprises passively monitoring for a partial text character from a signal of a text telephony call that has leaked through the voice coded channel to the communication node without having been conditioned for reliable transport over that channel.

8. The method of claim 7, wherein said passively monitoring comprises:
   estimating a sequence of tones respectively associated with a sequence of frames of the voice coded channel from noisy discrete-time samples of the signal; and
   estimating a sequence of bit values corresponding to the sequence of tones and determining, based on one or more rules that define a structure for the bit values of a text character, whether the sequence of bit values is characteristic of a partial text character.

9. The method of claim 8, wherein one of the rules defines a rigid structure for the bit values of a text character assuming correct estimation of the sequence of bit values despite the signal leaking through unconditioned, and another one of the rules defines a flexible structure for the bit values of a text character assuming incorrect estimation of at least some bit values in the sequence due to the signal leaking through unconditioned.

10. The method of claim 1, wherein passively monitoring for one or more partial or complete text characters in the call while the call is designated as a voice call comprises passively monitoring for a complete initial text character in the call.

11. The method of claim 1, wherein designating the call as a text telephony call responsive to said detection via said passive monitoring comprises tentatively designating the call as a text telephony call pending confirmation during full processing of the call as a text telephony call.

12. The method of claim 1, wherein said conditioning comprises encoding Baudot characters of the call into a 4-tone frequency shift keying (FSK) format with interleaving and convolutional encoding, and said deconditioning comprises recovering the Baudot characters from the 4-tone FSK format.

13. A communication node configured to process a call supported over a voice coded channel in a wireless communication network, the communication node comprising:
   one or more communication interfaces configured to transmit and receive signals of the call over the voice coded channel; and
   one or more processing circuits configured to:
      tentatively designate the call as a voice call as soon as the call is initiated;
      while the call is designated as a voice call, limit processing of the call as a text telephony call to passively monitoring for one or more partial or complete text characters in the call;
      responsive to detecting one or more partial or complete text characters in the call via said passive monitoring, designate the call as a text telephony call; and
      while the call is designated as a text telephony call, fully process the call as a text telephony call by passively detecting one or more complete text characters in the call as well as conditioning and de-conditioning signals of the call for reliable transmission and reception over the voice coded channel;
   wherein the communication node is configured to process multiple calls, and wherein the one or more processing circuits are configured, responsive to said detection via said passive monitoring, to release resources at the communication node performing said limited processing and select a resource for performing said fully processing from a pool of shared resources that are available at the communication node for fully processing a subset of the multiple calls processed by the communication node.

14. The communication node of claim 13, wherein the pool of shared resources is a pool of shared Cellular Text Telephone Modem (CTM) modem resources.

15. The communication node of claim 13, wherein resources at the communication node comprise processing resources instantiated by one or more digital signal processors at the communication node.

16. The communication node of claim 13, wherein the one or more processing circuits are further configured to set an initial state of the passive detection to be performed while the call is designated as a text telephony call with a final state of the passive monitoring already performed while the call was designated as a voice call.

17. The communication node of claim 13, wherein passive monitoring for one or more partial or complete text characters by the one or more processing circuits consists of:

for each of multiple sets of blocks of discrete-time samples from the call, determining whether that set of blocks conveys a bit of a text character, and if so determining the value of that bit, based on the number of blocks in the set that contain a first text telephony tone, the number of blocks in the set that contain a second text telephony tone, and the number of blocks in the set that do not contain any text telephony tone; and determining whether said multiple sets of blocks collectively convey a partial or complete text character based on one or more rules that define a structure for the bit values of a text character.

18. The communication node of claim 13, wherein the one or more processing circuits are configured to passively monitor for one or more partial or complete text characters in the call by passively monitoring for a partial text character from a signal of the call received over the voice coded channel by the communication node.

19. The communication node of claim 13, wherein the one or more processing circuits are configured to passively monitor for a partial text character from a signal of a text telephony call that has leaked through the voice coded channel to the communication node without having been conditioned for reliable transport over that channel.

20. The communication node of claim 19, wherein the one or more processing circuits are configured to passively monitor for a partial text character by:

estimating a sequence of tones respectively associated with a sequence of frames of the voice coded channel from noisy discrete-time samples of the signal; and estimating a sequence of bit values corresponding to the sequence of tones and determining, based on one or more rules that define a structure for the bit values of a text character, whether the sequence of bit values is characteristic of a partial text character.

21. The communication node of claim 20, wherein one of the rules defines a rigid structure for the bit values of a text character assuming correct estimation of the sequence of bit values despite the signal leaking through unconditioned, and another one of the rules defines a flexible structure for the bit values of a text character assuming incorrect estimation of at least some bit values in the sequence due to the signal leaking through unconditioned.

22. The communication node of claim 13, wherein the one or more processing circuits are configured to passively monitor for one or more partial or complete text characters in the call during limited processing of the call as a text telephony call by passively monitoring for a complete initial text character in the call.

23. The communication node of claim 13, wherein the one or more processing circuits are configured to designate the call as a text telephony call responsive to said detection via said passive monitoring by tentatively designating the call as a text telephony call pending confirmation during full processing of the call as a text telephony call.

24. The communication node of claim 13, wherein the one or more processing circuits are configured to condition signals of the call by encoding Baudot characters of the call into a 4-tone frequency shift keying (FSK) format with interleaving and convolutional encoding, and to decondition signals of the call by recovering the Baudot characters from the 4-tone FSK format.

* * * * *